(12) United States Patent
Stricker et al.

(10) Patent No.: US 9,920,655 B2
(45) Date of Patent: Mar. 20, 2018

(54) GAS TURBINE

(71) Applicant: MTU Aero Engines AG, Munich (DE)

(72) Inventors: Hans Stricker, Munich (DE); Stefan Rauscher, Aichach (DE)

(73) Assignee: MTU Aero Engines AG, Munich (DE)

( * ) Notice: Subject to any disclaimer, the term of this patent is extended or adjusted under 35 U.S.C. 154(b) by 297 days.

(21) Appl. No.: 14/539,466

(22) Filed: Nov. 12, 2014

(65) Prior Publication Data
US 2015/0132123 A1 May 14, 2015

(30) Foreign Application Priority Data

Nov. 13, 2013 (DE) .......................... 10 2013 223 133

(51) Int. Cl.
F01D 25/24 (2006.01)
F01D 9/02 (2006.01)
F01D 25/28 (2006.01)
F01D 9/04 (2006.01)
F01D 5/30 (2006.01)
F16B 21/18 (2006.01)
F16B 43/00 (2006.01)

(52) U.S. Cl.
CPC .............. F01D 25/246 (2013.01); F01D 9/02 (2013.01); F01D 25/28 (2013.01); F16B 21/183 (2013.01); F01D 5/3007 (2013.01); F01D 5/3015 (2013.01); F01D 9/042 (2013.01); F05D 2230/60 (2013.01); F16B 21/18 (2013.01); F16B 43/00 (2013.01); Y10T 29/49321 (2015.01)

(58) Field of Classification Search
CPC ...... F01D 25/246; F01D 9/042; F01D 5/3007; F01D 5/3015; F16B 21/18; F16B 21/183; F16B 43/00
See application file for complete search history.

(56) References Cited

U.S. PATENT DOCUMENTS

| 4,426,191 | A | * | 1/1984 | Brodell | ................. F01D 25/246 415/189 |
| 4,558,962 | A | * | 12/1985 | Meinlschmidt | ......... F16B 21/18 384/561 |
| 4,875,786 | A | | 10/1989 | DeWachter | |
| 5,352,079 | A | | 10/1994 | Croskey et al. | |
| 5,411,369 | A | | 5/1995 | Bouchard | |

(Continued)

FOREIGN PATENT DOCUMENTS

| DE | 8715968 | 1/1988 |
| DE | 10313018 | 12/2003 |

(Continued)

Primary Examiner — Justin Seabe
Assistant Examiner — Behnoush Haghighian
(74) Attorney, Agent, or Firm — Davidson, Davidson & Kappel, LLC

(57) ABSTRACT

A gas turbine having a guide vane assembly (2) and a securing ring (1) for axially locking the guide vane assembly in position that has a radially outer rim (1A) which is configured in a housing-side groove (3.1), a radially inner rim (1B) which is configured outside of the groove, and a slot (10) which extends from the radially outer rim to the radially inner rim, and a first flank having a radially inner rim section (12) and an undercut portion (11), the radially inner rim section forming an angle ($\alpha$) of at least 50° with the radially inner rim.

20 Claims, 1 Drawing Sheet

(56) References Cited

U.S. PATENT DOCUMENTS

| | | | |
|---|---|---|---|
| 5,937,985 A | 8/1999 | Dover et al. | |
| 6,715,767 B1 | 4/2004 | Meernik et al. | |
| 7,090,061 B2 | 8/2006 | Bove et al. | |
| 7,334,980 B2 | 2/2008 | Trinks et al. | |
| 8,287,241 B2 * | 10/2012 | Strohl | F01D 5/141 416/190 |
| 2014/0255196 A1 * | 9/2014 | Anderson | F01D 5/3015 416/218 |

FOREIGN PATENT DOCUMENTS

| | | |
|---|---|---|
| DE | 102010029309 | 12/2011 |
| EP | 0513956 | 11/1992 |
| FR | 970315 | 1/1951 |
| GB | 2152170 | 7/1985 |
| JP | H0771430 | 3/1995 |

* cited by examiner

US 9,920,655 B2

GAS TURBINE

This claims the benefit of German Patent Application DE 10 2013 223 133.4, filed Nov. 13, 2013 and hereby incorporated by reference herein.

The present invention relates to a gas turbine having a guide vane assembly and a securing ring for axially locking the guide vane assembly in position, as well as to a method for manufacturing such a gas turbine.

BACKGROUND

From in-plant practice, it is generally known for guide vane segments (generally referred to as "vane clusters") to be hooked in on the housing side. To secure them against falling out, the hooked-in vane clusters are axially secured by a securing ring, which, for this purpose, is inserted into a circumferential groove in a way that allows a radially inner partial section to project out of the groove, and an end face of the vane clusters to be secured.

To insert the securing ring into the circumferential groove, it is elastically deformed. To this end, it has a traversing slot, whose clearance width is reduced by this elastic deformation, it being possible for the radial end faces to overlap.

SUMMARY OF THE INVENTION

It is an object of an embodiment of the present invention to provide an improved gas turbine and/or to enhance the production thereof.

The present invention provides a gas turbine, in particular, an aircraft engine gas turbine, having at least one compressor stage or turbine stage including at least one guide vane assembly. In one variant, the guide vane assembly has a plurality of circumferentially side-by-side disposed vane clusters which, in a further embodiment, each have one or a plurality of guide vanes, respectively guide vane blades for deflecting an operating flow. In one variant, the guide vane assembly is hooked into a housing-side undercut portion of the gas turbine, most notably by an upstream flange, in particular positively and/or non-positively.

The guide vane assembly is axially locked in position by a securing ring, in particular positively and/or non-positively. In the present case, axial locking in position is understood, in particular, to be securing against falling out of the, in particular hooked-in guide vane assembly. In addition or alternatively, the securing ring may support the guide vane assembly in the axial direction as well, particularly when a rotor, in turn, is supported on the guide vane assembly in the axial direction due to a shaft breakage. In one variant, the securing ring is configured downstream, behind the guide vane assembly.

Particularly in an axial section orthogonally to an axis of rotation of the gas turbine, the securing ring has a radially outer rim, which is configured positively and/or non-positively in a housing-side circumferential groove and, accordingly, in one variant, extends at least substantially circumferentially. In addition, the securing ring has an opposite, radially inner rim that is configured outside of the groove to enable the guide vane assembly to be axially locked in position, in particular positively and/or non-positively, in particular to contact a preferably downstream end face of the guide vane assembly, in particular positively and/or non-positively.

A traversing radial slot extends from the radially outer rim to the radially inner rim. It features a first flank and a second flank that faces opposite the first flank in the circumferential direction. Along the lines of the present invention, a flank denotes an end face of the slotted securing ring in the circumferential direction.

Viewed in the radial direction, the first flank has an undercut portion. In the present case, this is understood most notably to mean that the first flank recedes circumferentially when considered from the radially inner rim toward the radially outer rim. In other words, the first flank has at least one section that is circumferentially offset from the slot relative to the radially inner rim.

In one variant, the undercut portion allows the securing ring to be advantageously removed from the groove. To this end, a corresponding, in particular hook-type tool engages behind the undercut portion, allowing the securing ring to be pulled radially out of the groove.

In one variant, the undercut portion may extend to the radially outer rim, respectively be radially outwardly open. One variant provides that it be able to be advantageously fabricated in this manner.

Most notably, the undercut portion may include a section, preferably a radially outer rim section of the first flank, in particular, be such a section that is at least substantially planar and that forms an angle of at least 85°, in particular of at least 110° with the radially outer rim.

In a further refinement, this section may form an angle of at least substantially 90° with the radially outer rim, respectively extend radially. Most notably, such a section of the first flank, respectively such an undercut portion may be formed by a radial slotting of the securing ring.

In a further refinement, the section may be formed as an oblique surface that forms an angle of at least 110° with the radially outer rim. Such a section of the first flank, respectively such an undercut portion may especially be formed by an oblique, respectively radial slotting of the securing ring.

In one variant, the first flank features a radially inner rim section that forms an angle of at least 50° with the radially inner rim.

This makes it possible in one variant to diminish the risk of the securing ring expelling itself, respectively lifting out undesirably, preferably of preventing the same, when, during operation, it shifts circumferentially, for example due to vibration mechanics and/or fluid mechanics, and the radially inner rim section of the first flank thereby abuts on an edge of the guide vane assembly, in particular a circumferentially adjacent vane cluster.

A radially inner rim section is understood, in particular, to be a section of the first flank that extends from the radially inner rim radially outwardly. In one variant, the radially inner rim section may be at least substantially planar and/or extend to the undercut portion. Together, therefore, the radially inner rim section and the undercut portion may form the entire first flank, in particular, which, accordingly, in one variant may have a kink, respectively two oblique surfaces that are inclined toward each other.

One variant makes it possible to minimize, preferably prevent any expulsion caused by an abutting of the rim section in that the radially inner rim section forms an angle of at least 50° with the radially inner rim.

In one variant, the radially inner rim section forms an angle of at least 60°, in particular of at least 70°, preferably of at least 85°, in particular of at least 110° with the radially inner rim. This makes it advantageously possible in one variant, in particular in the case of usual pairings of materials, to achieve a mechanical self-locking to prevent any expulsion caused by an abutting of the rim section.

In particular, the radially inner rim section may form an angle of at least essentially 90° with the radially inner rim, respectively extend radially. Most notably, such a radially inner rim section of the first flank may be formed by a radial partial slotting of the securing ring. When the slotting, in particular the undercut portion, is configured in one variant as an oblique, respectively radial slotting of the securing ring, a suitably inclined, in particular at least substantially radially inner rim section may be formed in one variant by a subsequent, in particular machining, cutting and/or especially by thermal removal of a radially inner flank region, in particular by milling, grinding, punch-forming, abrasion or the like.

In one variant, the second flank is configured to be at least substantially planar and in parallel to the oblique surface of the undercut portion of the first flank. This makes it possible in one variant for the undercut portion to be advantageously formed by a traversing, oblique slotting.

One aspect of the present invention relates to a method for manufacturing a gas turbine, as was clarified above, respectively a gas turbine that is manufactured in accordance with such a method. Manufacturing in the present case is understood, in particular, to be a (first-time) manufacturing of a (new) gas turbine. Manufacturing is also understood in the present case to be a reconstruction of an existing gas turbine, in particular, a reinstallation for maintenance and/or repair purposes.

Such a first-time building or rebuilding includes inserting the securing ring, which has been elastically deformed for this purpose, into the groove, while reducing the clearance width of the slot. In one variant, the securing ring inserted into the groove may subsequently be stress-relieved circumferentially, while the clearance width is correspondingly enlarged, at least partially, preferably to the point of a complete contact making in the groove.

In one variant, the undercut portion is formed, in particular initially, and the radially inner rim section is formed, in particular subsequently. The undercut portion and/or the radially inner rim section may be formed, in particular by machining, cutting and/or especially by thermal removal, in particular by milling, grinding, punch-forming, abrasion or the like. As clarified above, in accordance with one aspect of the present invention, an oblique slotting may initially be formed; a radially inner tip being subsequently removed, at least partially, in particular by a radial milling or the like. In this manner, in particular, a slot may be advantageously formed that, on the one hand, renders possible a removal of the securing ring in a process of engaging behind the undercut portion, and, at the same time, reduces, preferably prevents an undesirable lifting-out in response to a circumferential shifting of the securing ring in the groove.

BRIEF DESCRIPTION OF THE DRAWINGS

Other advantageous embodiments and refinements of the present invention will become apparent from the dependent claims and the following descriptions of preferred design variations. To this end, in a partially schematized form:

DETAILED DESCRIPTION

Figure 1:
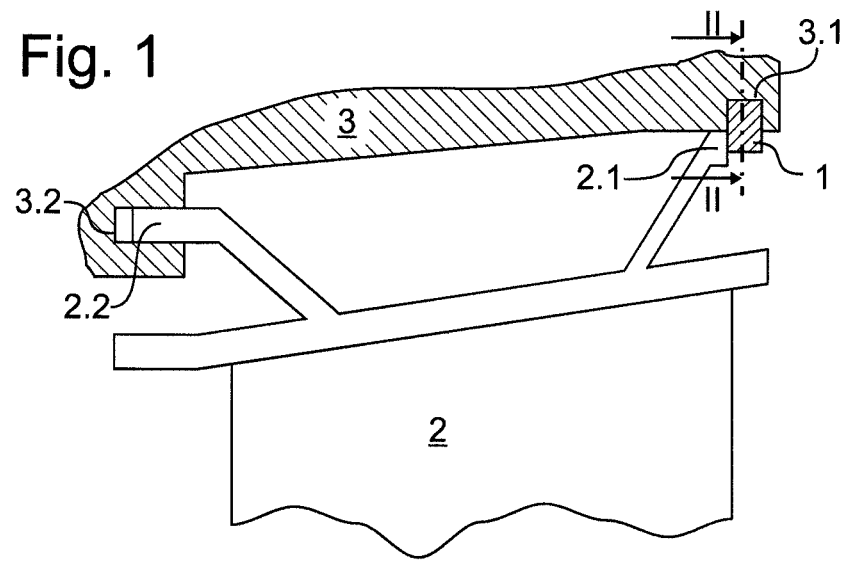
FIG. 1: shows a portion of a gas turbine in accordance with one embodiment of the present invention in a meridian section.

FIG. 1 shows a portion of an aircraft engine gas turbine in accordance with one embodiment of the present invention in a meridian section and having an (only partially illustrated) housing 3 and a guide vane assembly having a plurality of circumferentially side-by-side disposed vane clusters 2, of which one is partially shown in FIG. 1. This is hooked by an upstream flange 2.2 (to the left in FIG. 1) into a housing-side undercut portion 3.2 of the gas turbine.

At an opposite flange 2.1, the guide vane assembly is axially locked in position by a securing ring 1 that is configured downstream behind the guide vane assembly (to the right in FIG. 1), in particular is secured against falling out and, most notably, is supported in the axial direction in the event of a shaft breakage.

Figure 2:
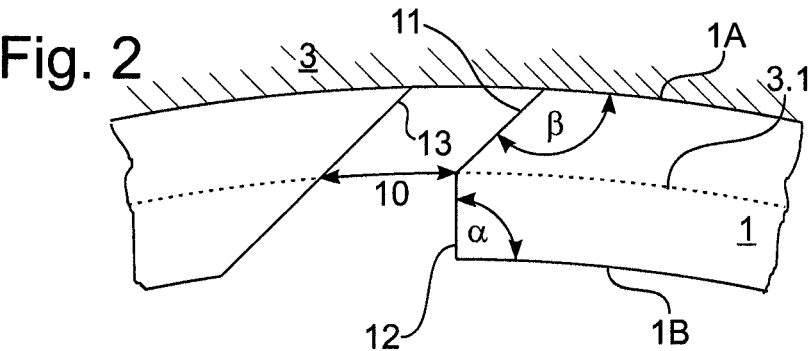
FIG. 2: shows a section along line II-II in FIG. 1.

As is especially discernible in the axial section of FIG. 2 along line II-II in FIG. 1, the securing ring has a radially outer rim 1A that is configured in a housing-side circumferential groove 3.1 and extends circumferentially (from left to right in FIG. 2). The securing ring has an opposite, radially inner rim 1B that is configured outside of groove 3.1 (whose radially inner rim is indicated by a broken line in FIG. 2), in order to axially lock in position a downstream end face of flange 2.1 of the guide vane assembly.

A traversing radial slot 10 extends from the radially outer rim to the radially inner rim. It has a first flank (to the right in FIG. 2) and a second flank (to the left in FIG. 2) that faces opposite the first flank in the circumferential direction.

Viewed in the radial direction (from bottom to top in FIG. 2), the first flank features an undercut portion 11. It is discernible in FIG. 2 that the first flank recedes circumferentially (to the right in FIG. 2) when considering the radially inner rim toward the radially outer rim.

Undercut portion 11 allows the securing ring to be advantageously removed from the groove. To this end, a corresponding, in particular hook-type tool engages behind the undercut portion, allowing the securing ring to be pulled radially out of the groove.

The undercut portion extends to the radially outer rim and is formed by a planar, radially outer rim section 11 of the first flank. Rim section 11 forms an angle $\beta$ of approximately 135° with the radially outer rim and is configured as oblique surface 11 of the first flank.

In addition, the first flank features a radially inner rim section 12 that forms an angle $\alpha$ of 90° with the radially inner rim.

This makes it possible to diminish the risk of the securing ring expelling itself, respectively lifting out undesirably, preferably of preventing the same, when, during operation, it shifts circumferentially, for example due to vibration mechanics and/or fluid mechanics, and the radially inner rim section of the first flank thereby abuts on an edge of the guide vane assembly, in particular a circumferentially adjacent vane cluster.

Radially inner rim section 12 extends from the radially inner rim radially outwardly. It is planar and extends to the undercut portion, respectively oblique surface 11, with which it jointly forms the entire first flank, that, consequently, has a kink, respectively is composed of two oblique surfaces 11, 12 that are inclined toward each other.

Second flank 13 is configured to be continuously planar and in parallel to the oblique surface of undercut portion 11 of the first flank.

To manufacture securing ring 1, an oblique slotting, which defines second flank 13 and undercut portion 11, is first formed by machine-cutting. A radially inner tip of the first flank that remains in the process being subsequently removed by a radial milling, so that radially inner rim section 12 remains which, together with radially inner rim 1B, forms angle $\alpha$.

From a production standpoint, this allows slot 10 to be readily formed which, on the one hand, renders possible a removal of the securing ring in a process of engaging behind undercut portion 11 and, at the same time, prevents an undesirable lifting-out as a result of a circumferential shifting of the securing ring in the groove.

Subsequently, in particular in the case of a rebuilding or a maintenance or repair, securing ring 1, which is elastically deformed for this purpose, is inserted into groove 3.1, while the clearance width of slot 10 is reduced, as indicated in FIG. 1. In this context, the mutually opposing end faces, respectively flanks of the slot may circumferentially overlap.

Although exemplary embodiments have been explained in the preceding description, it is noted that numerous modifications are possible. It is also noted that the exemplary embodiments are merely examples that in no way are intended to restrict the scope of protection, the uses and the design. Rather, the preceding description provides one skilled in the art with a guideline for executing at least one exemplary design, it being possible for various modifications to be made, in particular with regard to the function and configuration of the described components, without departing from the scope of protection, as is derived from the claims and the combinations of features equivalent thereto.

LIST OF REFERENCE NUMERALS 1 securing ring
1A/B radially outer/inner rim
2 vane cluster/assembly
2.1, 2.2 flange
3 housing
3.1 groove
3.2 undercut portion in the housing
10 slot
11 undercut portion of the first flank of the slot
12 radially inner rim portion of the first flank of the slot
13 second flank of the slot

What is claimed is:

1. A gas turbine comprising:
a housing having a circumferential groove;
a guide vane assembly having at least one vane extending radially inwardly with respect to the housing; and
a securing ring axially contacting and locking the guide vane assembly in position with respect to the housing, the securing ring having a radially outer rim configured in the groove, a radially inner rim configured outside of the groove, and a slot extending from the radially outer rim to the radially inner rim, a first flank of the slot having a radially inner rim section and an undercut portion, the radially inner rim section forming an angle of at least 50° with the radially inner rim, a second flank of the slot having a planar surface that is opposite both the undercut portion and the radially inner rim section of the first flank, the planar surface parallel to the undercut portion.

2. The gas turbine as recited in claim 1 wherein the radially inner rim section forms an angle of at least 85° with the radially inner rim.

3. The gas turbine as recited in claim 1 wherein the undercut portion forms an angle of at least 85° with the radially outer rim.

4. The gas turbine as recited in claim 1 wherein the undercut portion forms an angle of at least 110° with the radially outer rim.

5. The gas turbine as recited in claim 1 wherein the undercut portion has an oblique surface forming an angle of at least 110° with the radially outer rim.

6. A method for manufacturing a gas turbine as recited in claim 1 comprising the step of inserting the securing ring in an elastically deformed state into the groove, while reducing the clearance width of the slot.

7. The method as recited in claim 6 further comprising the steps of forming the undercut portion and forming the radially inner rim section by machining, cutting or thermal removal.

8. The method as recited in claim 7 wherein the undercut portion and the radially inner rim section are formed by the thermal removal.

9. The gas turbine as recited in claim 1 wherein the housing has a housing undercut portion upstream of the groove and the guide vane assembly has an upstream flange fitting into the undercut portion.

10. The gas turbine as recited in claim 1, wherein the inner rim section forms a 90 degree angle with the inner rim.

11. A gas turbine comprising:
a housing having a circumferential groove;
a guide vane assembly; and
a securing ring having a radially outer rim, a radially inner rim, a transversing radial slot extending from the radially outer rim to the radially inner rim, the radial slot having a first flank and a second flank opposite to the first flank in the circumferential direction, the first flank of the slot having a radially inner rim section and an undercut portion, the radially inner rim section forming an angle of at least 50° with the radially inner rim so as to define a kink, the radially outer rim being located in the circumferential groove and the radially inner rim being located outside the groove, the securing ring axially contacting and locking the guide vane assembly, the second flank having a planar surface that is opposite both the undercut portion and the radially inner rim section of the first flank, the planar surface parallel to the undercut portion.

12. The gas turbine as recited in claim 11 wherein the radially inner rim section forms an angle of at least 85° with the radially inner rim.

13. The gas turbine as recited in claim 11 wherein the undercut portion forms an angle of at least 85° with the radially outer rim.

14. The gas turbine as recited in claim 11 wherein the undercut portion forms an angle of at least 110° with the radially outer rim.

15. The gas turbine as recited in claim 11 wherein the undercut portion has an oblique surface forming an angle of at least 110° with the radially outer rim.

16. The gas turbine as recited in claim 11 wherein the housing has a housing undercut portion upstream of the groove and the guide vane assembly has an upstream flange fitting into the undercut portion.

17. A method for manufacturing a gas turbine as recited in claim 11 comprising the step of inserting the securing ring in an elastically deformed state into the groove, while reducing the clearance width of the slot.

18. The method as recited in claim 17 further comprising the steps of forming the undercut portion and forming the radially inner rim section by machining, cutting or thermal removal.

19. The method as recited in claim 18 wherein the undercut portion and the radially inner rim section are formed by thermal removal.

20. The gas turbine as recited in claim 11, wherein the inner rim section forms a 90 degree angle with the inner rim.

* * * * *